(12) United States Patent
Biswas et al.

(10) Patent No.: US 11,117,138 B2
(45) Date of Patent: Sep. 14, 2021

(54) SYSTEMS AND METHODS FOR GAS CLEANING USING ELECTROSTATIC PRECIPITATION AND PHOTOIONIZATION

(71) Applicant: Washington University, St. Louis, MO (US)

(72) Inventors: Pratim Biswas, St. Louis, MO (US); Tandeep S. Chadha, St. Louis, MO (US); Jiaxi Fang, St. Louis, MO (US)

(73) Assignee: Washington University, St. Louis, MO (US)

( * ) Notice: Subject to any disclaimer, the term of this patent is extended or adjusted under 35 U.S.C. 154(b) by 311 days.

(21) Appl. No.: 15/999,467

(22) PCT Filed: Feb. 17, 2017

(86) PCT No.: PCT/US2017/018468
§ 371 (c)(1),
(2) Date: Aug. 17, 2018

(87) PCT Pub. No.: WO2017/143255
PCT Pub. Date: Aug. 24, 2017

(65) Prior Publication Data
US 2019/0308202 A1    Oct. 10, 2019

Related U.S. Application Data

(60) Provisional application No. 62/297,270, filed on Feb. 19, 2016.

(51) Int. Cl.
*B03C 3/12*    (2006.01)
*B03C 3/08*    (2006.01)
(Continued)

(52) U.S. Cl.
CPC .............. *B03C 3/12* (2013.01); *B01D 53/86* (2013.01); *B01J 21/063* (2013.01); *B01J 35/004* (2013.01);
(Continued)

(58) Field of Classification Search
CPC combination set(s) only.
See application file for complete search history.

(56) References Cited

U.S. PATENT DOCUMENTS 3,653,185 A    4/1972    Scott et al.
3,718,029 A    2/1973    Gourdine et al.
(Continued)

FOREIGN PATENT DOCUMENTS

CN    101212128 A    7/2008
CN    105107317 A    12/2015
(Continued)

OTHER PUBLICATIONS

Jiang et al, Model for nanoparticle charging by diffusion, direct photoionization, and thermionization mechanisms, Journal of Electrostatics 65, 2007, pp. 209 to 220 _14851525 NPL 20160715 (Year: 2006).*

(Continued)

*Primary Examiner* — Christopher P Jones
*Assistant Examiner* — Sonji Turner
(74) *Attorney, Agent, or Firm* — Armstrong Teasdale LLP (57) ABSTRACT

A gas cleaning system includes an inlet receiving a gas, an outlet spaced apart from the inlet, a gas channel defined between the inlet and the outlet to direct the gas from the inlet to the outlet, a photoionizer disposed to emit radiation towards a portion of the gas channel, and a first electrode module. The first electrode module includes a first discharge electrode assembly that generates a corona discharge within (Continued)

the gas channel and a first collection electrode assembly that collects ionized particles from the gas in the gas channel.

15 Claims, 10 Drawing Sheets

(51) Int. Cl.

| | |
|---|---|
| B03C 3/016 | (2006.01) |
| B03C 3/41 | (2006.01) |
| B03C 3/47 | (2006.01) |
| B03C 3/60 | (2006.01) |
| B03C 3/68 | (2006.01) |
| B01D 53/86 | (2006.01) |
| B01J 21/06 | (2006.01) |
| B01J 35/00 | (2006.01) |
| B03C 3/38 | (2006.01) |
| B03C 3/02 | (2006.01) |
| B03C 3/36 | (2006.01) |

(52) U.S. Cl.
CPC .............. *B03C 3/016* (2013.01); *B03C 3/025* (2013.01); *B03C 3/08* (2013.01); *B03C 3/368* (2013.01); *B03C 3/383* (2013.01); *B03C 3/41* (2013.01); *B03C 3/47* (2013.01); *B03C 3/60* (2013.01); *B03C 3/68* (2013.01); *B01D 2255/20707* (2013.01); *B01D 2255/802* (2013.01); *B03C 2201/04* (2013.01); *B03C 2201/08* (2013.01)

(56) References Cited

U.S. PATENT DOCUMENTS

| | | | |
|---|---|---|---|
| 3,984,296 A | 10/1976 | Richards | |
| 4,070,163 A | 1/1978 | Kolb et al. | |
| 4,750,917 A * | 6/1988 | Fujii | B03C 3/383 422/24 |
| 5,476,538 A | 12/1995 | Nishio et al. | |
| 5,973,904 A | 10/1999 | Pui et al. | |
| 5,993,738 A * | 11/1999 | Goswani | A61L 9/18 422/121 |
| 6,149,717 A | 11/2000 | Satyapal et al. | |
| 6,187,271 B1 | 2/2001 | Lee et al. | |
| 6,387,844 B1 | 5/2002 | Fujishima et al. | |
| 6,861,036 B2 * | 3/2005 | Biswas | B01J 19/088 204/164 |
| 6,878,192 B2 | 4/2005 | Pasic | |
| 7,077,890 B2 * | 7/2006 | Botvinnik | B03C 3/08 96/69 |
| 7,291,207 B2 * | 11/2007 | Taylor | B01D 53/32 422/186.04 |
| 7,311,762 B2 * | 12/2007 | Taylor | B03C 3/32 422/186.04 |
| 7,393,385 B1 * | 7/2008 | Coffey | B03C 3/383 95/59 |
| 7,405,672 B2 * | 7/2008 | Taylor | C01B 13/10 340/629 |
| 7,522,703 B2 | 4/2009 | Okuyama et al. | |
| 7,553,353 B2 | 6/2009 | Lepage | |
| 7,582,144 B2 | 9/2009 | Krigmont | |
| 7,695,690 B2 | 4/2010 | Taylor et al. | |
| 7,767,169 B2 | 8/2010 | Snyder et al. | |
| 7,796,727 B1 | 9/2010 | Kaufman | |
| 8,328,917 B2 | 12/2012 | Garfield et al. | |
| 9,488,382 B2 * | 11/2016 | Krichtafovitch | B03C 3/12 |
| 2004/0025695 A1 | 2/2004 | Zhang et al. | |
| 2004/0042151 A1 * | 3/2004 | Biswas | G21K 5/02 361/229 |
| 2005/0000793 A1 | 1/2005 | Taylor et al. | |
| 2005/0238551 A1 * | 10/2005 | Snyder | A61L 9/205 422/186.3 |
| 2006/0108537 A1 | 5/2006 | Okyuama et al. | |
| 2008/0170971 A1 * | 7/2008 | Bergeron | B03C 3/12 422/171 |
| 2009/0010801 A1 * | 1/2009 | Murphy | F24F 3/166 422/4 |
| 2013/0052090 A1 * | 2/2013 | Bohlen | A61L 9/22 422/121 |
| 2015/0102822 A1 | 4/2015 | Okuda et al. | |
| 2015/0352242 A1 | 12/2015 | Ando et al. | |
| 2020/0109869 A1 * | 4/2020 | Makipaa | A61L 9/22 |

FOREIGN PATENT DOCUMENTS

| | | |
|---|---|---|
| JP | H08238441 A | 9/1996 |
| JP | 2000005631 A | 1/2000 |
| RU | 2111797 C1 | 5/1998 |
| RU | 13755 U1 | 5/2000 |
| RU | 2212592 C1 | 9/2003 |
| RU | 2480244 C2 | 4/2013 |
| SU | 1315024 A1 | 6/1987 |
| SU | 1375342 A1 | 2/1988 |
| WO | 2006098397 A | 9/2009 |
| WO | 2014007558 A1 | 1/2014 |

OTHER PUBLICATIONS

European Extended Search Report regarding European Patent Application No. 17753967.3 dated Sep. 2, 2019; pp. 1-13.
International Search Report and Written Opinion issued in PCT/US2017018468 dated Jun. 8, 2017.

* cited by examiner

SYSTEMS AND METHODS FOR GAS CLEANING USING ELECTROSTATIC PRECIPITATION AND PHOTOIONIZATION

CROSS REFERENCE TO RELATED APPLICATIONS

This application claims priority to International Application Number PCT/US2017018468, filed on Feb. 17, 2017, which claims priority to U.S. Provisional Patent Application Ser. No. 62/297,270 filed on Feb. 19, 2016, the disclosures of which are hereby expressly incorporated by reference in their entirety

FIELD

The present disclosure is generally directed to gas cleaning systems, and more particularly, gas cleaning systems using electrostatic precipitators and photoionization.

BACKGROUND

Gases such as air sometimes contain dust, pollutants, microorganisms, airborne molecular contaminants, volatile organic compounds and other contaminants that may be undesirable for health reasons, environmental reasons, and other reasons. At least some ventilation systems or filtration systems include one or more filters that the gas passes through. The filters remove contaminants from the gas while enabling the gas to pass through to an external system. For example, a filter installed within a ventilation system collects dust from the air while the air is circulated throughout a residential home.

Electrostatic precipitators (ESPs) are one form of filter that has been used in at least some known filtration or ventilation systems to remove contaminants from air. The ESPs operate by ionizing particles including some of the contaminants within the air. The ionized particles are collected and removed from the air as it flows to an external system. However, these known ESPs may have limited collection efficiency for high speed, large volume gases. To increase the number ionized particles, the voltage of the ESPs may be increased. In addition to ionizing particles, the increased voltage may cause an increased concentration of undesirable byproducts, such as ozone, to be generated from the gas.

BRIEF DESCRIPTION

In one aspect, a gas cleaning system includes an inlet receiving a gas, an outlet spaced apart from the inlet, a gas channel defined between the inlet and the outlet to direct the gas from the inlet to the outlet, a photoionizer disposed to emit radiation towards a portion of the gas channel, and a first electrode module. The first electrode module includes a first discharge electrode assembly that generates a corona discharge within the gas channel and a first collection electrode assembly that collects ionized particles from the gas in the gas channel.

In another aspect, a gas cleaning system includes a first filter module and a first photoionizer. The first filter module includes an inlet for receiving a gas, an outlet spaced apart from the inlet, a gas channel defined between the inlet and the outlet to direct the gas from the inlet to the outlet, and an electrode module disposed in the gas channel. The electrode module includes a discharge electrode assembly that generates a corona discharge within the gas channel and a collection electrode assembly that collects ionized particles from the gas in the gas channel. The first photoionizer is disposed to emit radiation towards a portion of the first filter module gas channel.

DETAILED DESCRIPTION

The systems and methods described herein are generally directed to gas cleaning systems, and more particularly, gas cleaning systems using electrostatic precipitators and photoionization.

The gas cleaning system described below includes discharge electrodes, collection electrodes, and a photoionizer. A gas, such as air, flows through a gas channel of the system. The discharge electrodes generate a unipolar corona discharge that ionizes particles (such as contaminants) within the gas. In addition, the photoionizer emits radiation that ionizes more particles within the gas. The ionized particles are collected by the collection electrodes and removed from the gas such that the gas is cleaned or purified of contaminants. The system may also include a barrier that collects the ionized particles in addition to preventing radiation from the photoionizer from exiting the system. A controller may be communicatively coupled to the photoionizer, and a power supply electrically coupled to the discharge and collection electrodes to selectively adjust the operation of the system in response to sensor data from a sensor monitoring the gas channel.

Figure 1:
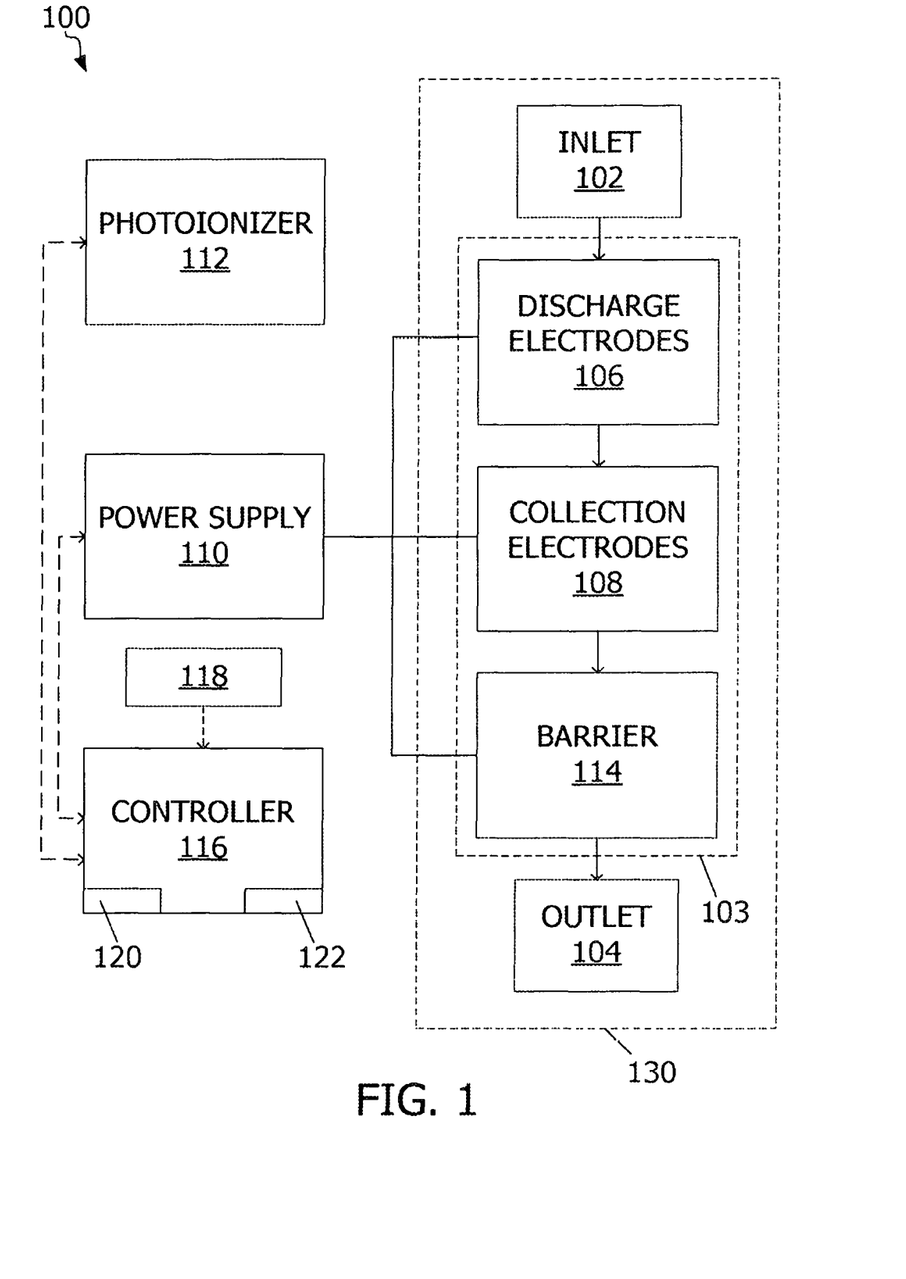
FIG. 1 is a block diagram of an example gas cleaning system.

FIG. 1 is a block diagram of an example gas cleaning system 100. The system 100 is configured to remove contaminants from a moving gas. In particular, the system 100 is configured to remove contaminants from the air. As used herein, "contaminants" refer to particles dispersed within the gas. For example, the contaminants may include dust, other gases, debris, pollutants, pathogens, aerosol particles, microorganisms (e.g., bioaerosols), bacteria, volatile organic compounds, and other foreign materials. System 100 may be used in a stand-alone configuration or in combination with other systems, such as a ventilation or filtration system.

In the example embodiment, the system 100 includes an inlet 102, an outlet 104, an assembly of discharge electrodes 106, an assembly of collection electrodes 108, a power supply 110, a photoionizer 112, a barrier 114, a controller 116, and a sensor 118. In other embodiments, the system 100 may include additional, fewer, or alternative components, including those described elsewhere herein. The system 100 may be formed in an housing (not shown) such as a duct that may be installed in ventilation and filtration systems in place of conventional filters such as high-efficiency particulate arrestance (HEPA) filters.

The system 100 is configured to receive a gas through the inlet 102 and discharge the gas through the outlet 104. A gas channel 103 is defined between the inlet 102 and the outlet 104. Gases flowing in the gas channel 103 generally have a unidirectional flow from the inlet 102 to the outlet 104. The gases may have, for example, a flow rate or velocity between 100 feet per minute and 1000 feet per minute through the gas channel 103. In other embodiments, the gas may have a different flow velocity, such as between 0.1 feet per minute to 10 feet per minute. In some embodiments, the system 100 may be configured to direct the gas from the inlet 102 to the outlet 104. In such embodiments, the inlet 102, the gas channel 103, and/or the outlet 104 may include one or more fans, blowers, and/or other air movers to direct the gas from the inlet 102 to the outlet 104. In other embodiments, an external system may cause the gas to travel through the gas channel 103. For example, system 100 may be positioned in an air duct of a ventilation system. An external fan of the ventilation system may direct the gas through the gas channel 103.

The discharge electrodes 106 and the collection electrodes 108 are positioned between the inlet 102 and the outlet 104 within the gas channel 103 and spaced apart from each other. It is to be understood that the system 100 may include any number of discharge electrodes 106 and collection electrodes 108 (including one). In the example embodiment, the discharge electrodes 106 are upstream from the collection electrodes 108. In other embodiments, the discharge electrodes 106 and the collection electrodes 108 may be positioned in a different configuration. In one example, the discharge electrodes 106 and the collection electrodes are parallel to or even with each other. In another example, the discharge electrodes 106 and the collection electrodes 108 may be positioned in a two-stage configuration with alternating rows of the discharge electrodes 106 and the collection electrodes 108. In example embodiments, the discharge electrodes 106 are positioned between about 0 inches and about 50 inches upstream of the collection electrodes 108. In some embodiments, a series of discharge electrodes 106 are be placed upstream of collection electrodes 108. Each group of one or more discharge electrodes 106 in the series may be spaced a different distance upstream of the collection electrodes.

The discharge electrodes 106 and the collection electrodes 108 are electrically coupled to the power supply 110 to receive power. More particularly, the discharge electrodes 106 receive power from the power supply 110 to generate a corona discharge. In one example, the discharge electrodes 106 may be positively or negatively charged with a voltage between 5 kilovolts (kV) and 15 kV. The electric field produced by the discharge electrodes 106 electrically charges or ionizes molecules within the gas without causing arcing to occur. In other embodiments, any other suitable voltage, whether greater or lesser, may be applied to the discharge electrodes 106. A portion of the contaminants within the gas near the discharge electrodes 106 are ionized. In addition to ionizing the molecules, bioorganic material within the gas may be inactivated by the corona discharge and/or by the photoionization. In the example embodiment, the corona discharge is unipolar. Alternatively, the corona discharge may be bipolar (i.e., the discharge electrodes 106 include negatively and positively charged electrodes).

The gas with the ionized molecules flow downstream to the collection electrodes 108. The collection electrodes 108 are configured to attract or collect the ionized particles as the gas passes towards the outlet 104. More particularly, the collection electrodes 108 are electrically grounded to attract the ionized molecules. Alternatively, the collection electrodes 108 may have a voltage with an opposing polarity to the voltage applied to the discharge electrodes. In the example embodiment, the collected particles remain physically and electrically coupled to the collection electrodes 108 while the gas continues to flow towards and through the outlet 104. Accordingly, at least a portion of the contaminants are removed from the gas exiting the outlet 104 for circulation and use.

The photoionizer 112 is configured to emit or irradiate radiation across a portion of the gas channel 103. The photoionizer 112 may emit, for example, soft x-ray radiation (i.e., wavelength between approximately 0.13 nm and 0.41 nm), hard x-ray radiation (i.e., wavelength below approximately 0.13 nm), ultraviolet radiation, and/or extreme ultraviolet radiation. In at least some embodiments, the photoionizer 112 is configured to emit radiation having a wavelength between approximately 0.13 nm and 150 nm. It is to be understood that the photoionizer 112 may be configured to emit radiation at a different wavelength and/or to selectively adjust the type of radiation emitted (e.g., between ultraviolet and soft x-ray radiation). The photoionizer 112 is positioned upstream of the discharge electrodes 106 and the collection electrodes 108 at a predetermined distance. In other embodiments, the photoionizer 112 is positioned at a different location, such as downstream or adjacent to the discharge electrodes 106 and/or the collection electrodes 108. In certain embodiments, the collection electrodes 108 may be a formed from a mesh material that enables an increased transmission of radiation to reach each discharge electrode 106. That is, if the collection electrodes 108 are between the discharge electrodes 108 and the photoionizer 112, the mesh collection electrodes 108 may permit more of the emitted radiation from the photoionizer to pass through to the discharge electrodes 106. In other embodiments, the collection electrodes may be fabricated from a solid material. The photoionizer 112 is configured to emit radiation to a portion of the gas channel 103 including or near to the discharge electrodes 106 and/or the collection electrodes 108. The distance between the photoionizer 112 and the discharge electrodes 106 and/or collection electrodes 108 may be varied depending upon the characteristics of the particular photoionizer 112 and other components used, as well as and the dimensions of the system. The distance between the photoionizer 112 and the discharge electrodes 106 is generally selected to substantially maximize the coverage of the discharge electrodes 106 by the emitted radiation from the photoionizer 112. In example embodiments, the distance between the photoionizer 112 and the discharge electrodes may be between 1 inch and 100 inches.

The radiation produced by the photoionizer 112 causes the gas to be ionized through diffusion charging. Unlike direct charging from the discharge electrodes 106, where the particles receive energy and form an ion, diffusion charging causes the particles within the gas to collide and become electrically charged. The applied voltage from the radiation may be between approximately 3.5 kiloelectronvolts (keV) and 15 keV. The diffusion charging produces bipolar ions (i.e., positively and negatively charged ions). Ionizing the particles with the photoionizer 112 enables the discharge electrodes 106 to generate a corona at a reduced threshold voltage ("corona inception voltage").

In at least some embodiments, the discharge electrodes 106 and/or the collection electrodes 108 may be coated with a photocatalytic material (not shown in FIG. 1). In some embodiments, the photocatalytic material is titanium oxide or a different semiconductor oxide. In other embodiments, the photocatalytic material can include a metal oxide including titanium dioxide, zinc oxide, copper oxide, vanadium oxide, niobium oxide, the above metal oxides doped with metals such as titanium dioxide doped with niobium and/or vanadium. In addition, other non-photocatalytic materials may be used, such as carbon, graphene oxide, reduced graphene oxide, crumpled reduced graphene oxide, graphene and combinations of all of the above. In at least some embodiments, the photocatalyst may be nano-structured. Nanostructured photocatalysts may provide a higher surface area for radiation, catalysis and better charge transport properties. When the photoionizer 112 emits radiation at the coated electrode, the radiation is absorbed by the photocatalyst. An electron is promoted to the conductive band of the photocatalyst and a hole is formed in the valence band. The electron in the conductive band and the hole in the valance band enable the electrode to perform redox reactions with the passing gas to remove gaseous compounds from the gas that may not have been ionized through the direct and diffusion charging of the discharge electrodes 106 and the photoionizer 112. The photocatalyst and the photoionizer 112 facilitate improved degradation efficiency of system 100 while preventing or reducing ozone produced by system 100 caused by increasing the voltage of the discharge electrodes 106.

The barrier 114 is positioned downstream from the discharge electrodes 106, the collection electrodes 108, and the photoionizer 112. In the example embodiment, the barrier 114 is positioned adjacent to the outlet 104. The barrier 114 may be a filter placed on the outlet 104 such that the gas exiting through the outlet 104 passes through the barrier 114. The barrier 114 may be any shape, size, material, and/or configuration to function as described herein. In some embodiments, the design of the barrier 114 is such that a straight path is not available for the x-ray to escape. For example, the barrier 114 may be a mesh grid attached to the outlet. In another example, the barrier 114 may be a diffusive barrier that enables the gas to pass through and prevent the radiation for passing through the outlet 104. The barrier 114 may be made using any suitable material, including, for example, any metal, PVC, acrylic, plastic, glass or carbon based material. The barrier 114 is coupled to power supply 110 and/or collection electrode 108. In the example embodiment, the barrier 114 is electrically grounded with the collection electrode 108. In other embodiments, the barrier 114 may have a different applied voltage. For example, the barrier 114 may have an applied voltage with an opposite polarity in comparison to the voltage applied to the discharge electrode. The barrier 114 is configured to collect ionized particles (including any ionized contaminants) that have passed the collection electrode 108. In addition, the barrier 114 is configured to block radiation produced by the photoionizer from exiting the gas channel 103 through the outlet 104. The barrier 114 is configured to absorb at least a portion of the radiation. Additionally or alternatively, the barrier 114 is configured to reflect at least a portion of the radiation towards the discharge and collection electrodes 106, 108.

In the example embodiment, the controller 116 is communicatively coupled to the power supply 110 and the photoionizer 112 to operate the system 100. The controller 116 may be any suitable controller for performing as described herein, including any suitable analog controller, digital controller, or combination of analog and digital controllers. In some embodiments, the controller 116 includes a processor 120 that executes instructions for software that may be loaded into a memory device. The processor 120 may be a set of one or more processors or may include multiple processor cores, depending on the particular implementation. Further, the processor 120 may be implemented using one or more heterogeneous processor systems in which a main processor is present with secondary processors on a single chip. In another embodiment, the processor 120 may be a homogeneous processor system containing multiple processors of the same type.

In some embodiments, the controller 116 includes memory device 122. As used herein, the memory device 120 is any tangible piece of hardware that is capable of storing information either on a temporary basis and/or a permanent basis. The memory device 120 may be, for example, without limitation, a random access memory and/or any other suitable volatile or non-volatile storage device. The memory device 120 may take various forms depending on the particular implementation, and may contain one or more components or devices. For example, the memory device 120 may be a hard drive, a flash memory, a rewritable optical disk, a rewritable magnetic tape, and/or some combination of the above. The media used by the memory device 120 also may be removable. For example, without limitation, a removable hard drive may be used for the memory device 122.

The controller 116 is configured to selectively adjust an output of the power supply 110 to generate the corona discharge with the discharge electrodes 106. For example, the controller 116 may adjust a magnitude of the voltage provided to the discharge electrodes 106. The controller 116 is further configured to selectively adjust an output (i.e., the radiation) of the photoionizer 112. For example, the controller 116 may adjust the wavelength, frequency, intensity, and/or direction of the output of the photoionizer 112.

In at least some embodiments, the controller 116 may be configured to automatically control the power supply 110 and the photoionizer 112 in response to sensor data from the sensor 118. The system 100 may include more than one sensor 118 in communication with the controller 116 to provide feedback from the system 100. The sensor 118 is configured to monitor the system 100 and the gas to collect the sensor data. The sensor data may include, but is not limited to, gas flow rate data, electrical data (e.g., voltage, current, and power), radiation data, particle density data, and gas composition data. In some embodiments, the sensor 118 is an optical sensor. The controller 116 may display the sensor data on a communicatively coupled display (not shown) for analysis or store the sensor data in the memory device 122. In addition, based on the sensor data, the controller 116 may adjust the operation of the power supply 110 and the photoionizer 112 to facilitate increased collection of the contaminants within the gas.

The system 100 further includes a housing 130. In the example embodiment, the inlet 102 and the outlet 104 are formed at opposing ends of the housing 130. The housing 130 includes an interior cavity that defines the gas channel 103. The discharge electrodes 106, the collection electrodes 108, and the barrier 114 are positioned within the housing 130. In at least some embodiments, the photoionizer 112 and the sensor 118 are positioned on or within the housing 130. In other embodiments, the photoionizer 112 may be positioned external to the housing 130. In such embodiments, the housing 130 may include an opening, such as a window, to facilitate transmission of radiation from the photoionizer 112 to the gas channel 103. The housing 130 may be formed from a material configured to absorb or reflect radiation emitted by the photoionizer 112 to prevent the radiation from exiting the system 100. The housing 130 may be configured to be modular to facilitate retrofitting and installation in addition to installation of multiple housings 130 together as described herein.

Figure 2:
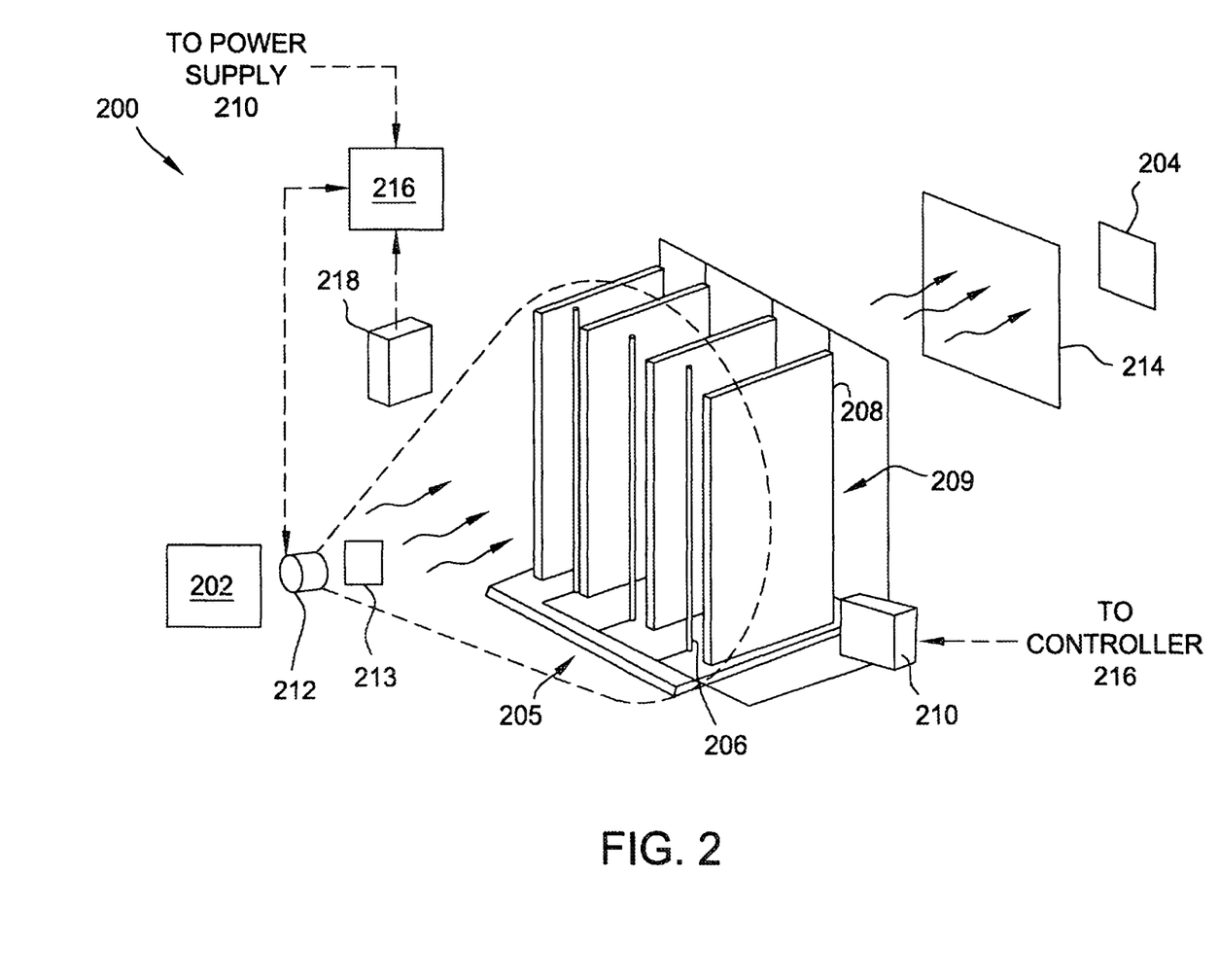
FIG. 2 is a perspective view of an example single-stage gas cleaning system according to the system shown in FIG. 1.

FIG. 2 is a perspective view of an exemplary gas cleaning system 200 for removing contaminants from an air mixture. The system 200 is similar to the system 100 shown in FIG. 1 and, in the absence of contrary representation, has similar components and functionality. In the example embodiment, the system includes an inlet 202, an outlet 204, an electrode module 205, a power supply 210 coupled to the electrode module 205, a photoionizer 212, a barrier 214, a controller 216, and a sensor 218.

The electrode module 205 includes a plurality of discharge electrodes 206 and a plurality of collection electrodes 208. In the example embodiment, the electrode module includes three discharge electrodes 206 and four collection electrodes 208. In other embodiments, the electrode module may include more or fewer discharge and collection electrodes 206, 208. The discharge electrodes 206 are positioned in a row upstream from a row of the collection electrodes 208. The row of discharge electrodes 206 is disposed such that each discharge electrode 206 is positioned between two collection electrodes 208. Although only one electrode module 205 is shown, it is to be understood that multiple electrode modules 205 may be positioned adjacent to each other to cover the gas channel and/or to match the coverage of the radiation emitted by the photoionizer 212.

In the example embodiment, the discharge electrodes 206 are longitudinally extending cylindrical poles within the gas channel. In other embodiments, the discharge electrodes may have a different geometry (e.g., plates) and/or position. The cylindrical structure facilitates a substantially uniform corona discharge around the circumference of each discharge electrode. The discharge electrodes 206 are spaced apart from each other and the collection electrodes 208 to prevent arcing. The collection electrodes 208 are longitudinally extending plates within the gas channel. The plate structure has an extending surface area that enables the collection electrodes 208 to collect an increased number of ionized particles. In the example embodiment, the collection electrodes include a photocatalytic coating 209. Positioning the discharge and collection electrodes 206, 208 within the gas channel facilitates enhanced coverage and efficiency of the system 200. In some embodiments, discharge electrodes 206 are cylindrical wires. The discharge electrodes 206 may have sharp edges on the surface to facilitate the corona. Alternatively, the discharge electrodes 206 may have any other suitable shape.

The photoionizer 212 is positioned upstream from the electrode module 205 and directs radiation towards the electrode module 205. In some embodiments, an ion trap 213 may be positioned between the photoionizer 112 and the gas channel to block either positive or negative ions, thereby only generating unipolar ions within the gas channel. For example, if the discharge electrodes 106 are generating negatively charged coronas, the ion trap may block positively charged ions from the photoionizer 112. The barrier 214 is positioned at the outlet 204 to prevent the radiation for exiting the system 200.

Figure 3:
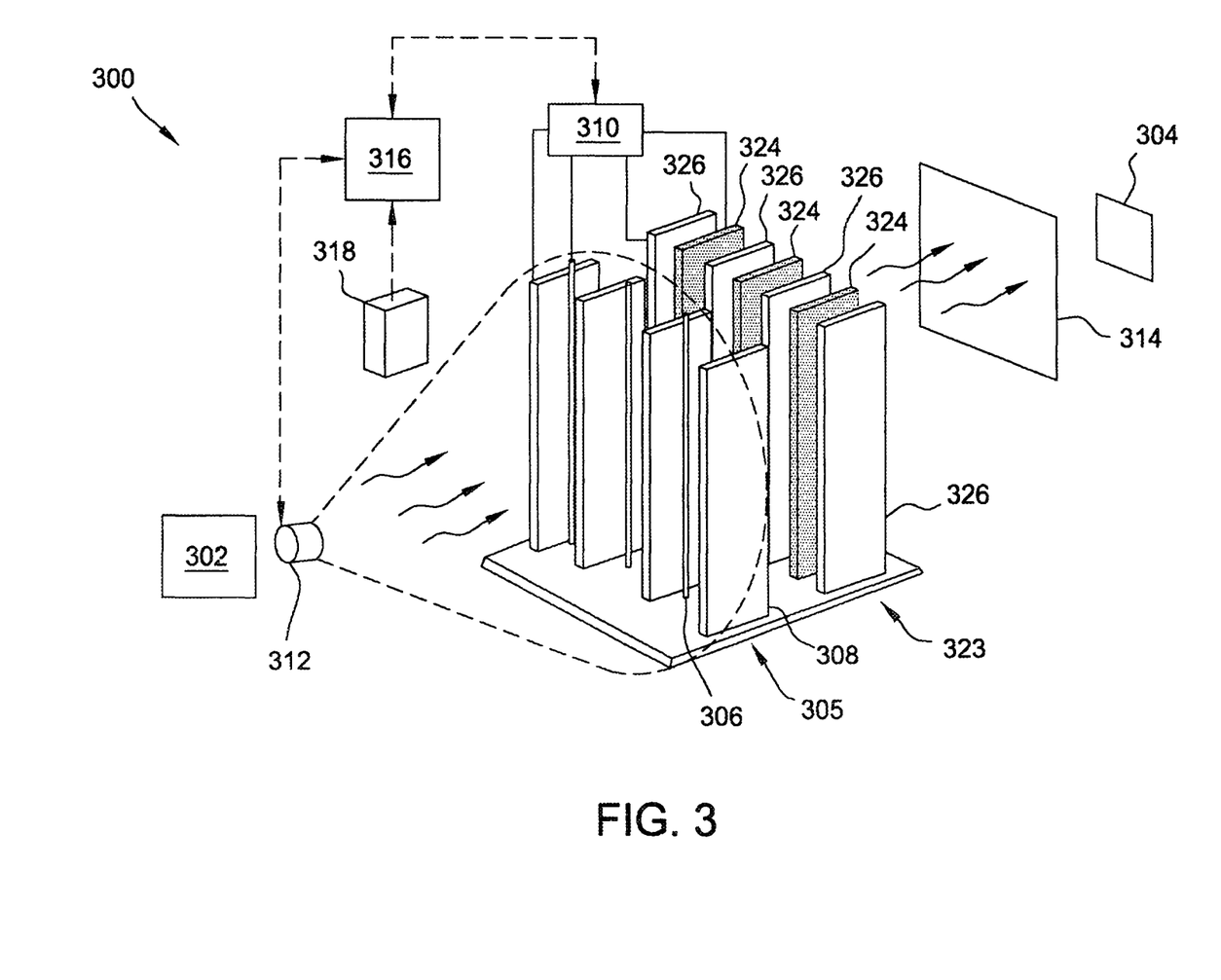
FIG. 3 is a perspective view of an example two-stage gas cleaning system according to the system show in FIG. 1.

FIG. 3 is a perspective view of an exemplary two stage gas cleaning system 300 for removing contaminants from an air mixture. The system 300 is similar to the systems 100, 200 shown in FIGS. 1 and 2, and, in the absence of contrary representation, has similar components and functionality. In the example embodiment, the system 300 includes an inlet 302, an outlet 304, a first electrode module 305, a power supply 310, a photoionizer 312, a barrier 314, a controller 316, a sensor 318, and a second electrode module 323. The first electrode module 305 includes a plurality of discharge electrodes 306 and a plurality of collection electrodes 308.

The second electrode module 323 is positioned downstream from the first electrode module 305 and is configured to collect contaminants that the first electrode module did not collect. The second electrode module 323, similar to the first electrode module 305, includes a plurality of discharge electrodes 324 and a plurality of collection electrodes 326. In the example embodiment, the discharge and collection electrodes 324, 326 are positioned in an alternating row such that one discharge electrode 324 is positioned between two collection electrodes 326. In some embodiments, the photoionizer 312 may be positioned to emit radiation towards the second electrode module 323. In such embodiments, the discharge electrodes 324 and/or the collection electrodes 326 may include a photocatalytic coating. Although the system 300 is shown as a two-stage gas cleaning system, it is to be understood that the system 300 may include a different number of stages and electrode modules, such as three.

In at least some embodiments, the gas cleaning systems described above may be modular to facilitate installation of gas cleaning systems of various sizes, filtration requirements, air flow requirements, and/or other system requirements. For example, the modular design of the gas cleaning systems enable the systems to be installed in air ducts of different sizes and different air flow rates.

Figure 4:
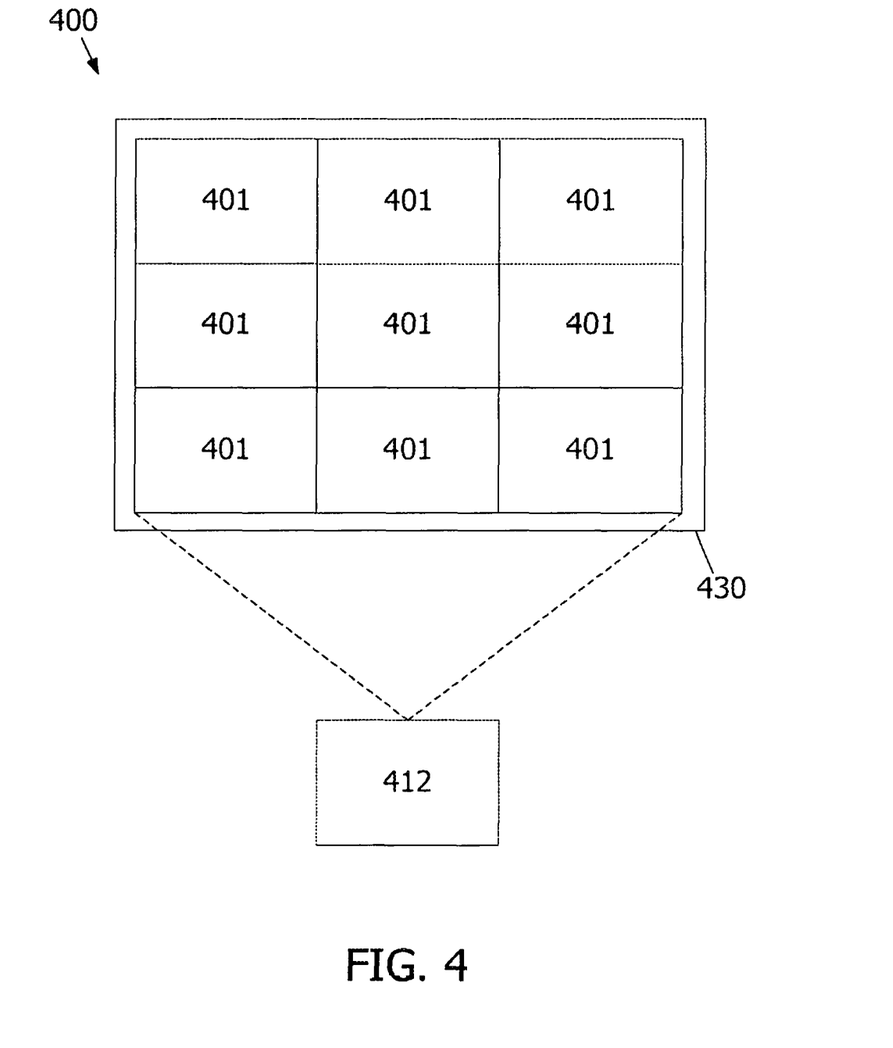
FIG. 4 is a block diagram of an example modular gas cleaning system for removing contaminants from gases.

FIG. 4 is block diagram of a modular gas cleaning system 400 for removing contaminants from gases. The system 400 includes a plurality of filter modules 401, a photoionizer 412, and a housing 430. The system 400 may include additional, fewer, or alternative components, including those described elsewhere herein.

The filter modules 401 are modular blocks installed within the housing 430. Each of the filter modules 401 includes at least a portion of one of the systems 100, 200, and/or 300. In one example, the filter modules 401 include discharge electrodes, collection electrodes, and a barrier (each not shown). The modular configuration enables the filter modules 401 to be installed into various sizes of housings and to match the radiation emitted by the photoionizer 412.

In the example embodiment, the single photoionizer 412 is configured to emit radiation towards all of the filter modules 401 to reduce the number of photoionizers used by the system 400. In other embodiments, the system 400 may include additional photoionizers to facilitate sufficient radiation is directed within each filter module 401 to ionize particles of the gas.

Although not shown, it is to be understood that the system 400 may further include one or more power supplies and controllers coupled to the filter modules 401 to provide power and operate the system 400. Alternatively, each filter module 401 may include a separate power supply and/or controller.

Figure 5:
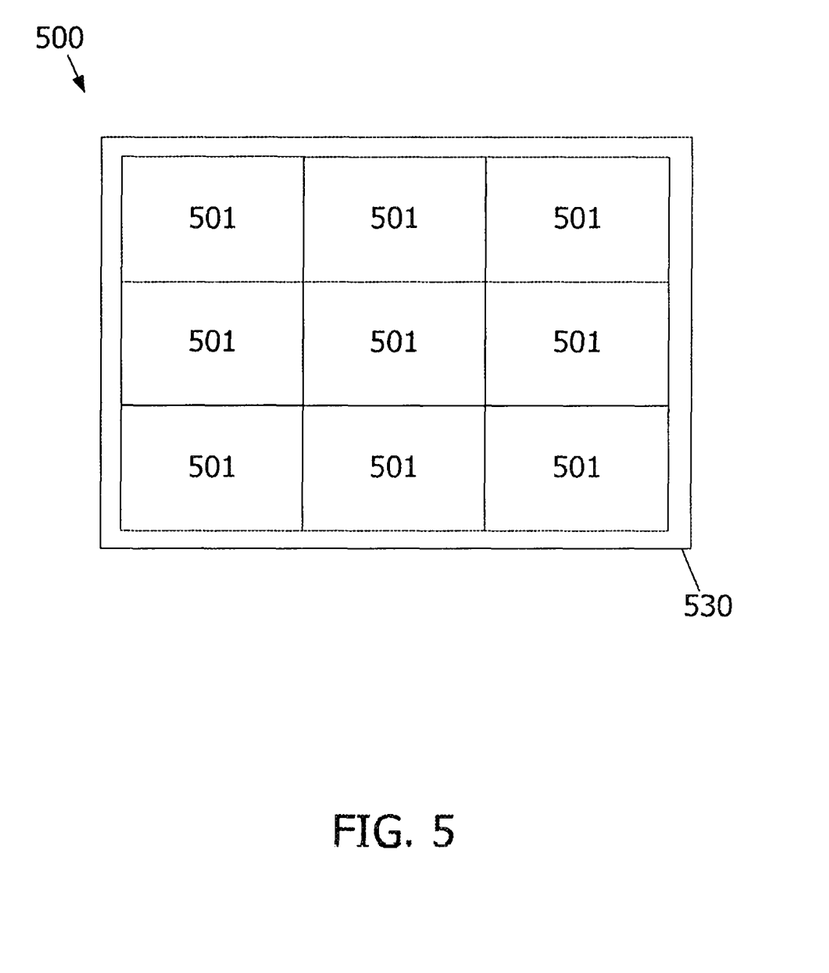
FIG. 5 is a block diagram of another example modular gas cleaning system for removing contaminants from gases.

FIG. 5 is a block diagram of another example modular gas cleaning system 500 for removing contaminants from gases. The system 500 includes a plurality of filter modules 501 and a housing 530. Each filter module 501 includes one or more of the systems 100, 200, 300, and 400 (shown in FIGS. 1-4, respectively) for removing contaminants from the gases flowing through the housing 530. In some embodiments, the housing 530 is an air duct.

Figure 6:
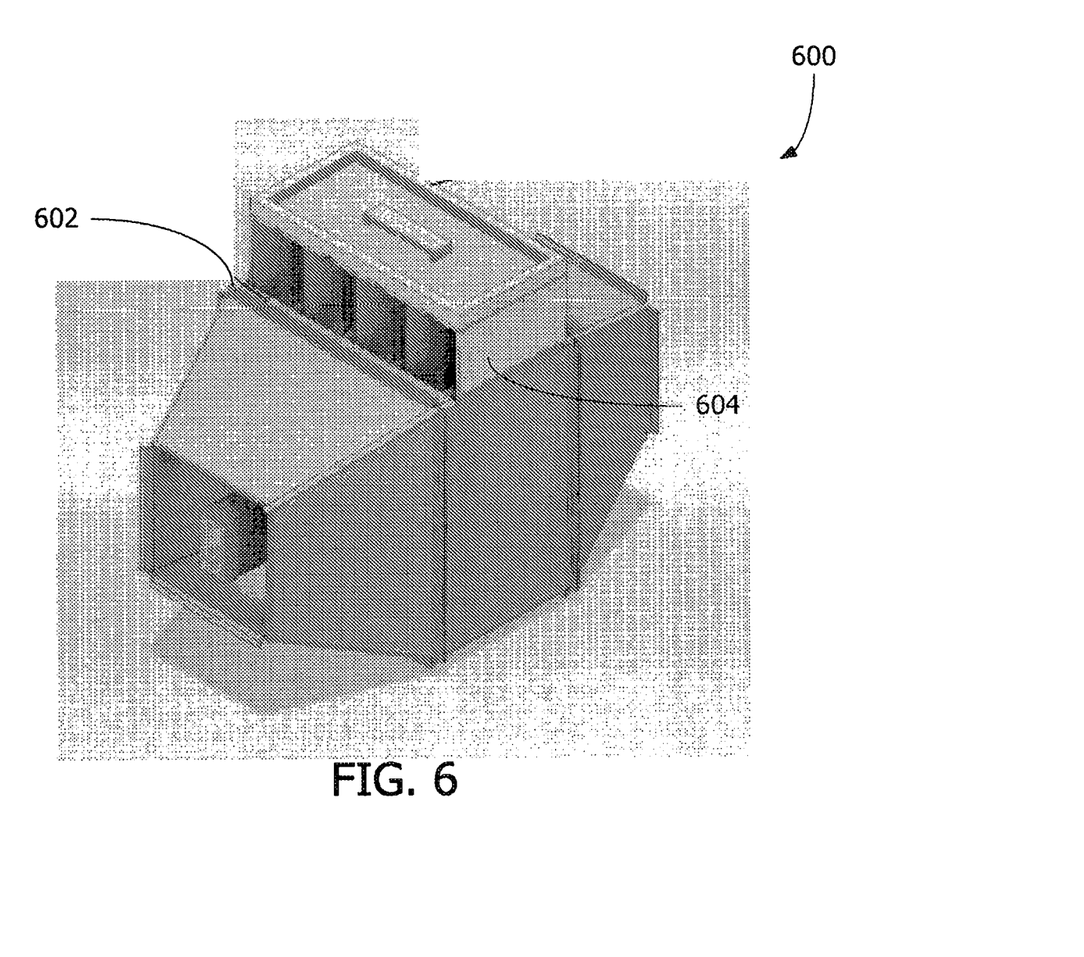
FIG. 6 is a perspective view of an example precipitator that may be used in the system shown in FIG. 1.
Figure 7:
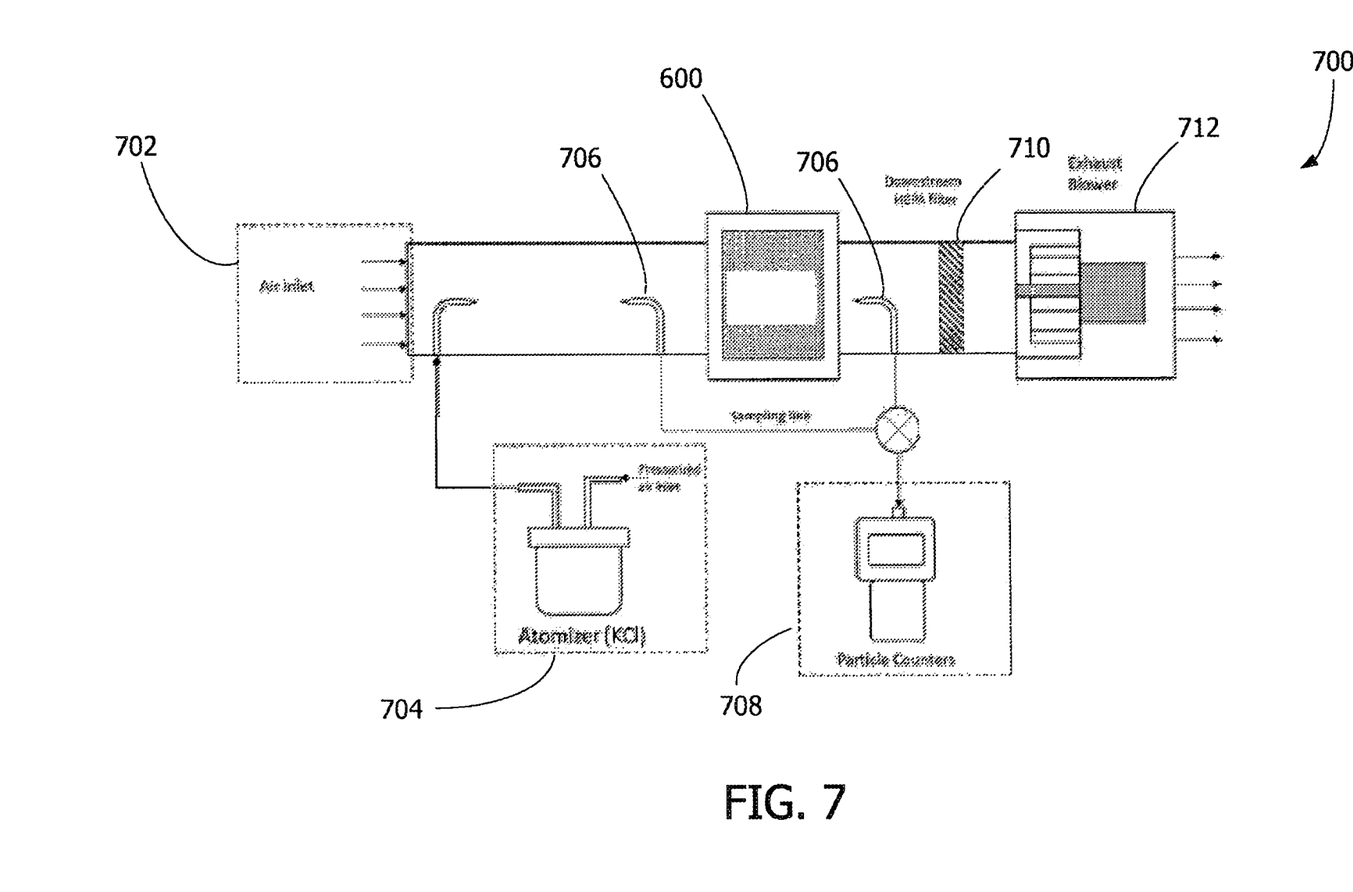
FIG. 7 is a schematic diagram of an example test system that includes the precipitator shown in FIG. 6.

In an example experiment, a precipitator with a photoionizer was constructed. FIG. 6 is a perspective view of an example precipitator 600 that may be used with system 100 (shown in FIG. 1). FIG. 7 is a schematic diagram of an example test system 700 that includes the precipitator 600.

With respect to FIGS. 6 and 7, system 700 includes an air inlet 702, an atomizer 704, the precipitator 600, sensors 706, a particle counter 708, a filter 710, and an exhaust blower 712. In the example experiment, the atomizer 704 is configured to introduce an atomized mixture of potassium chloride (KCl) into an air stream between the inlet 702 and the precipitator 600 for experimental purposes. The sensors 706 are coupled to the particle counter 708 to collect data, specifically particle concentration, associated from the air stream. The precipitator 600 includes a charging stage 602 (i.e., discharge electrodes) and a collection stage 604 (i.e., collection electrodes) to remove the particles from the air stream. When the air stream exits the precipitator 600, the filter 710 passively (i.e., no power is provided to the filter 710) filters the air stream for particles. The air stream then exits system 700 via the exhaust blower 712.

Figure 8:
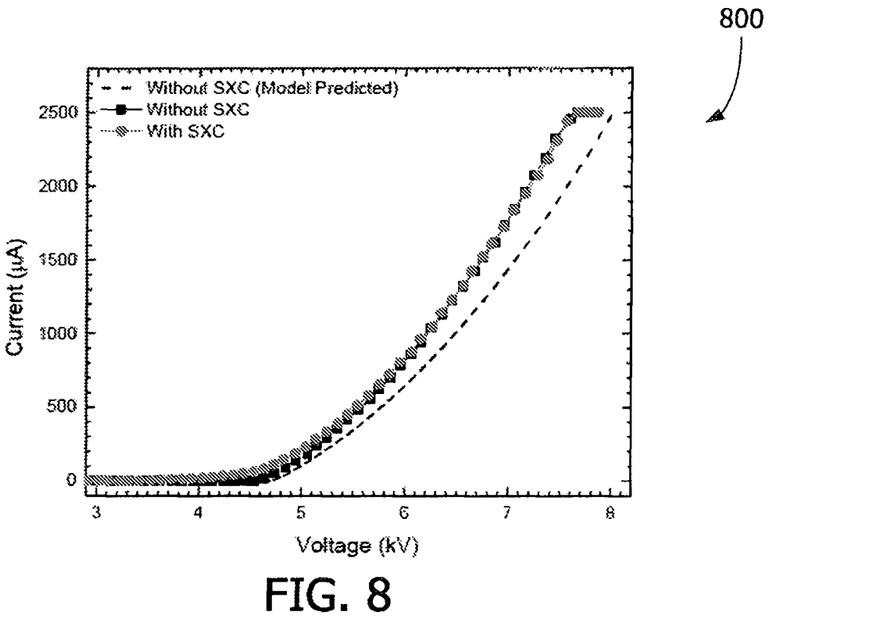
FIG. 8 is a graph depicting measured IV characteristics from the precipitator shown in FIG. 6.

The current-voltage (IV) characteristics of the precipitator 600 in the example experiment were measured with and without the use of the photoionizer. FIG. 8 is a graph 800 depicting the measured IV characteristics. The use of the photoionizer led to a significant shift in the corona onset voltage and enhancements in current near the corona onset voltages. At voltages higher than 7.6 kV, in the example experiment, the current saturates due to the limitation of the power supply used. Further, the graph 800 also shows predicted IV curves for precipitator 600 which closely match the IV values near the corona onset region, but underestimate the current at higher voltages.

Figure 9:
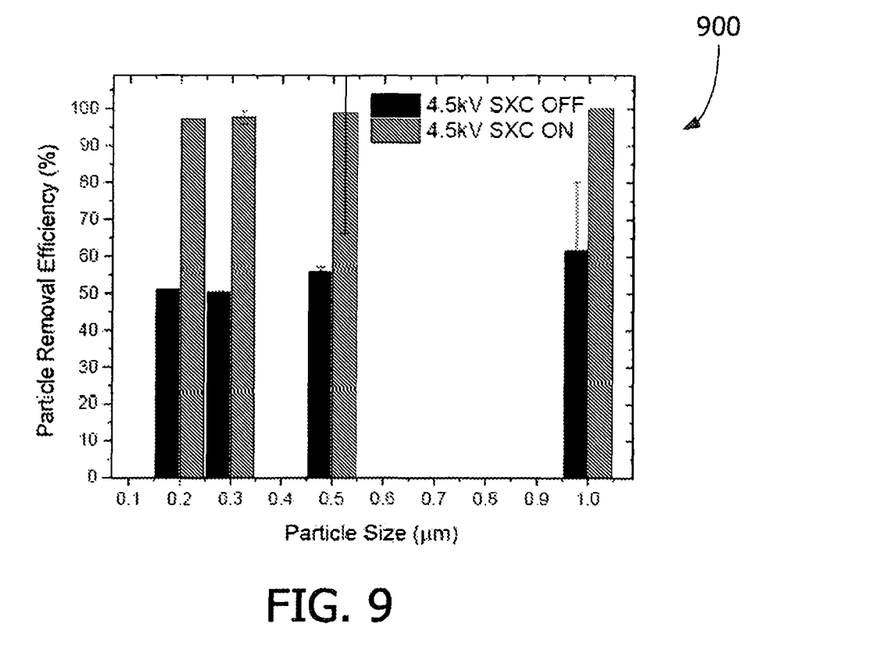
FIG. 9 is a graph showing measured particle removal efficiencies of the precipitator shown in FIG. 6 with the soft x-ray photoionizer on and off at a flow velocity of 125 feet per minute.

With respect again to FIG. 7, air jet atomization of a KCl solution was used by the atomizer 704 to generate aerosolized particles and the filtration efficiency of the precipitator 600 was measured by the particle counter 708. FIG. 9 is a graph 900 of the measured particle removal efficiencies of the precipitator 600 with the soft x-ray photoionizer on (SXC ON) and off (SXC OFF) at a flow velocity of 125 feet per minute (fpm). With an electrostatic precipitator system without the photoionizer, the efficiencies of particle removal in the 0.2-1.0 µm range were approximately 50-60%. However, using the photoionizer-enhanced precipitator 600, the efficiencies of particle removal increased to approximately 97-99%.

Figure 10:
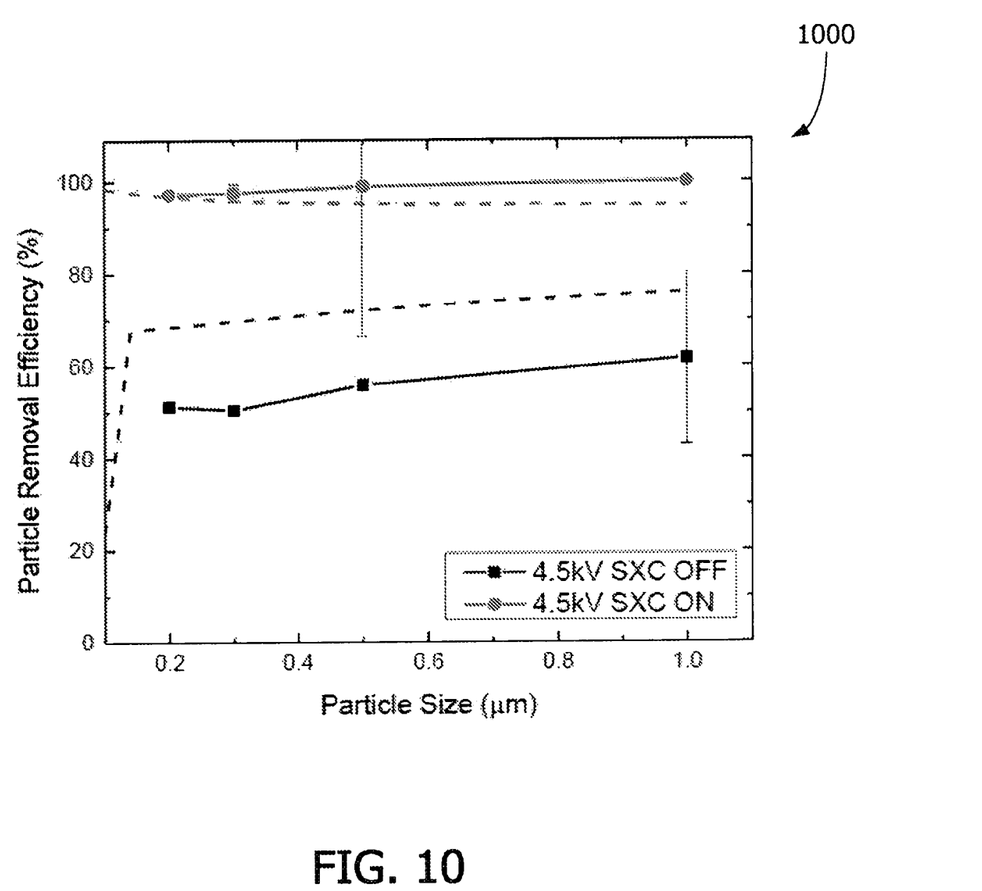
FIG. 10 is a graph showing predicted and measured particle removal efficiencies for the precipitator shown in FIG. 6.

FIG. 10 is a graph 1000 of predicted and measured particle removal efficiencies for the precipitator 600. The predicted particle removal efficiencies of the precipitator 600 are relative accurate with respect to the measured particles removal efficiency of the precipitator 600. The predicted removal efficiencies overestimate the removal efficiencies of precipitator systems without a photoionizer. The removal efficiencies of pathogens is expected to follow a similar trend as particles since aerosolized pathogens may be considered similar to particles.

Figure 11:
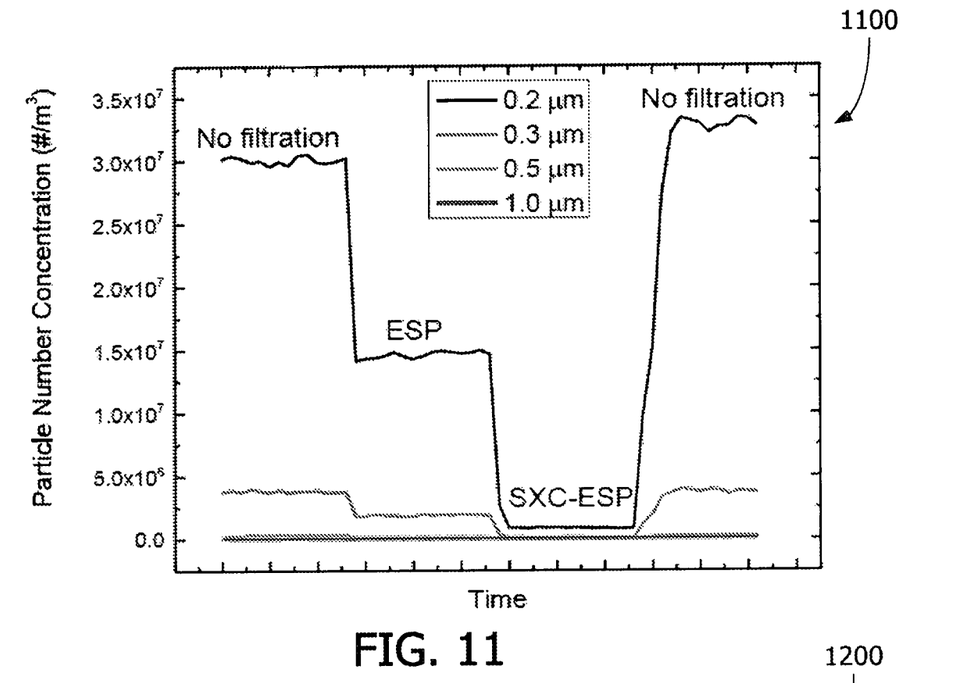
FIG. 11 is a graph of real-time control of particle concentration in a duct system placed in a laboratory environment using the precipitator shown in FIG. 6.
Figure 12:
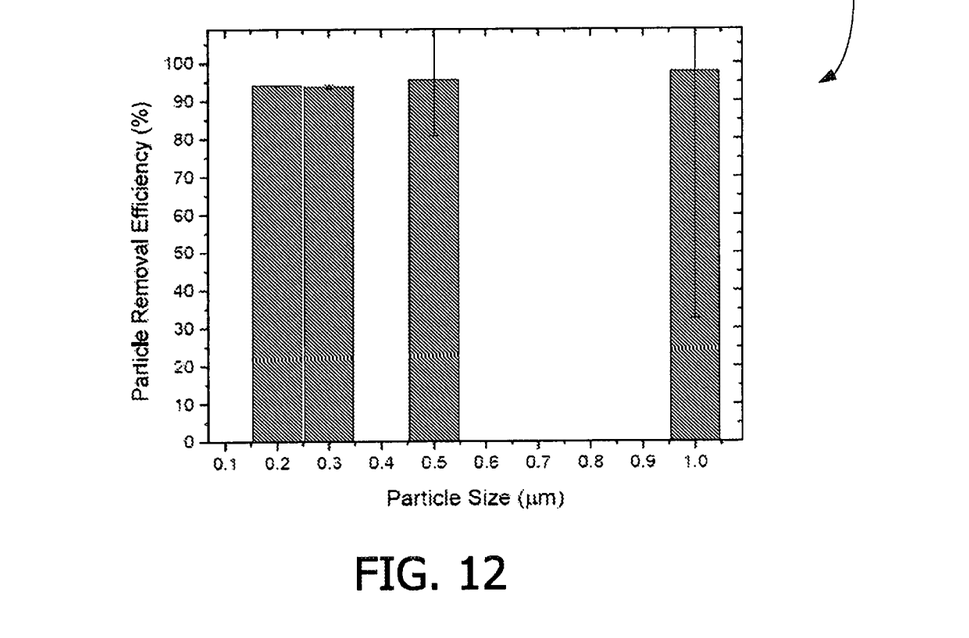
FIG. 12 is a graph depicting efficiencies of the precipitator shown in FIG. 6 in removing laboratory environment aerosols at 500 feet per minute flow velocities.

In the example experiment, the performance of the precipitator 600 was also measured at HVAC operating conditions. The precipitator 600 with a duct system and a blower fan was placed in a lab environment and the in-situ efficiency of the precipitator 600 in removing laboratory environment aerosols was monitored. FIG. 11 is a graph 1100 showing the real-time control of particle concentration in the duct system placed in a laboratory environment. The real time control ability offers the tuning of the precipitator 600 depending on the air quality within the environment. FIG. 12 is a graph 1200 depicting the efficiencies of the precipitator 600 in removing laboratory environment aerosols at 500 fpm flow velocities (HVAC standard for filters).

The systems described above facilitate enhanced contaminant removal from a gas using electrostatic precipitation and photoionization. In one example, the system has a collection efficiency exceeding 95% for all particle size in the range of 0.001-100 micrometer. The systems above further facilitate retrofitting of existing ventilation and filtration systems. By combining photoionization with electrostatic precipitation, the system above enables increased collection efficiency of contaminants within the gas without generating an increased concentration of ozone or other undesirable byproducts. In one example, the ozone concentration at the outlet of the system is less than 50 parts per billion (ppb).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas cleaning system comprising:
   an inlet configured to receive a gas;
   an outlet spaced apart from the inlet;
   a gas channel defined between the inlet and the outlet to direct the gas from the inlet to the outlet;
   a photoionizer disposed to emit radiation towards a portion of the gas channel, wherein the photoionizer comprises a soft x-ray photoionizer configured to emit radiation at a wavelength between about 0.13 nanometers and about 0.41 nanometers;
   a barrier positioned at the outlet, the barrier configured to collect ionized particles and to prevent the radiation emitted by the photoionizer from passing through the outlet; and
   a first electrode module comprising
   a first discharge electrode assembly configured to generate a corona discharge within the gas channel; and
   a first collection electrode assembly configured to collect ionized particles from the gas in the gas channel.

2. The gas cleaning system of claim 1 further comprising:
   a sensor configured to collect sensor data associated with the gas in the gas channel;

a power supply electrically coupled to the first discharge electrode assembly and the first collection electrode assembly; and a controller communicatively coupled to the sensor, the power supply, and the photoionizer, wherein the controller is configured to operate the power supply and the photoionizer in response to the collected sensor data.

3. The gas cleaning system of claim 1, wherein the first collection electrode assembly comprises a plurality of parallel plate collection electrodes.

4. The gas cleaning system of claim 1, wherein the first collection electrode assembly comprises a mesh collection electrodes.

5. The gas cleaning system of claim 1, wherein the first discharge electrode assembly comprises a plurality of parallel plate discharge electrodes.

6. The gas cleaning system of claim 1, wherein the first discharge electrode assembly comprises a plurality of cylindrical discharge electrodes.

7. The gas cleaning system of claim 1 further comprising a second electrode module disposed between the first electrode module and the outlet, the second electrode module comprising:

a second discharge electrode assembly configured to generate a corona discharge within the gas channel;

a second collection electrode assembly configured to collect ionized particles from the gas in the gas channel.

8. The gas cleaning system of claim 1 further comprising an air mover configured to force a flow of the gas through the gas channel.

9. The gas cleaning system of claim 1, wherein the photoionizer is configured to emit at least one of soft x-ray radiation, hard x-ray radiation, ultraviolet radiation, and extreme ultraviolet radiation.

10. The gas cleaning system of claim 1, wherein the first collection electrode assembly includes a photocatalytic coating configured to inactivate bioaerosols within the gas when the emitted radiation contacts the photocatalytic coating.

11. The gas cleaning system of claim 10, wherein the photocatalytic coating comprises a nanostructured photocatalytic coating.

12. The gas cleaning system of claim 10, wherein the photocatalytic coating comprises titanium dioxide.

13. The gas cleaning system of claim 12, wherein the photocatalytic coating comprises doped titanium dioxide.

14. The gas cleaning system of claim 1 further comprising an ion trap positioned between the photoionizer and the gas channel.

15. The gas cleaning system of claim 14, wherein the ion trap is configured to capture ions of a single polarity.

* * * * *